(12) United States Patent
Pack

(10) Patent No.: US 6,526,025 B1
(45) Date of Patent: Feb. 25, 2003

(54) METHOD FOR MEASURING NETWORK PERFORMANCE PARITY

(75) Inventor: Charles David Pack, Oceanport, NJ (US)

(73) Assignee: Ameritech Corporation, Hoffman Estates, IL (US)

( * ) Notice: Subject to any disclaimer, the term of this patent is extended or adjusted under 35 U.S.C. 154(b) by 0 days.

(21) Appl. No.: 09/316,523

(22) Filed: May 21, 1999

(51) Int. Cl.[7] ................................................ H04J 1/16
(52) U.S. Cl. ..................... 370/252; 370/386; 379/15.01
(58) Field of Search ................................ 370/252, 385, 370/241–251, 386, 389, 400, 401, 352–356; 379/8, 22, 26.01, 88.17, 15.01

(56) References Cited

U.S. PATENT DOCUMENTS 6,333,931 B1 * 12/2001 LaPier et al. ............... 370/385

OTHER PUBLICATIONS

Szelag, C.R., "Trunk Demand Servicing in the Presence of Measurement Uncertainty," *BSTJ*, vol. 59, No. 6, Jul.–Aug., 1980, pp. 845–860.
Committee T1 Report No. 11 (Jun. 1991).
"Trunk Traffic Engineering Concepts and Applications," Bellcore SR–TAP–000191, Issue 2, Dec. 1989.
Pack, C.D., Gordon, J., Fredericks, A.A., "White Paper on Performance Parity," Ameritech, 1998, Monmouth University, West Long Branch, NJ 07764.
"Common Transport Trunk Group Performance Data," Bellcore SR STS–000317, Draft Issue 2, Apr. 1990.

* cited by examiner

*Primary Examiner*—Hassan Kizou
*Assistant Examiner*—John Pezzlo
(74) *Attorney, Agent, or Firm*—Brinks Hofer Gilson & Lione

(57) ABSTRACT

A method for measuring network performance parity includes the steps of computing a call completion ratio for at least one network provider, and determining whether the call completion ratio passes a first test. These steps may further include computing a first call completion ratio for a first network provider, a second call completion ratio for a second network provider, a difference between the first call completion ratio and the second call completion ratio, and a variance for the difference. The method also includes the step of assessing whether a second test is determinate if the call completion ratio does not pass the first test, by determining whether the variance is greater than a variance cutoff. In addition, the method includes the step of assessing whether a call completion ratio passes the second test, if the second test is determinate, by determining whether the difference is greater than a threshold.

20 Claims, 11 Drawing Sheets

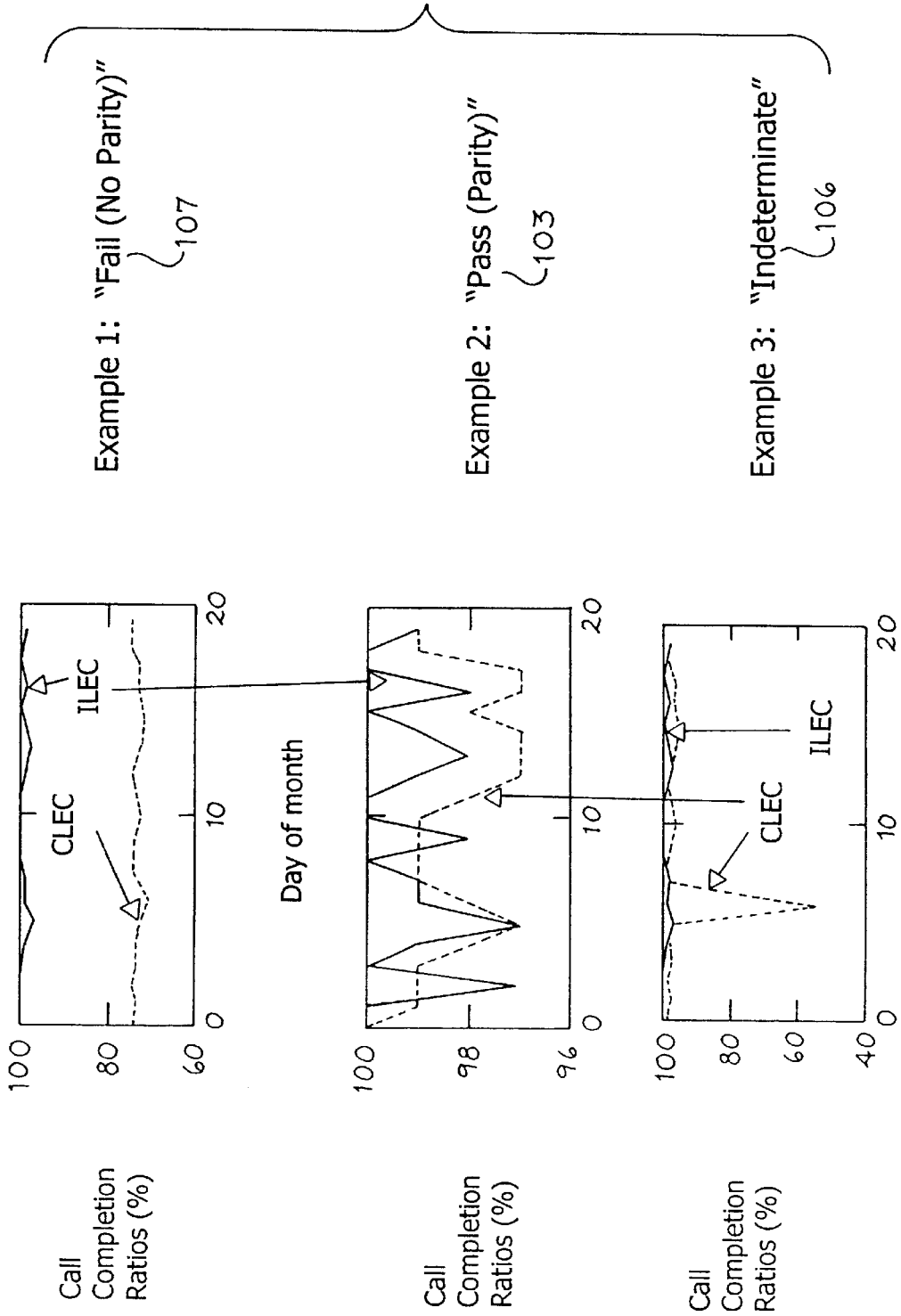

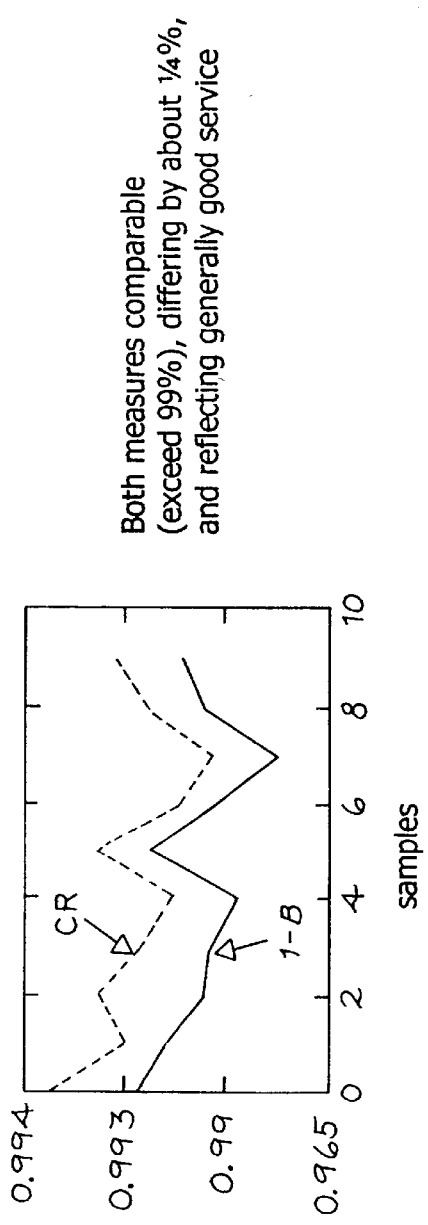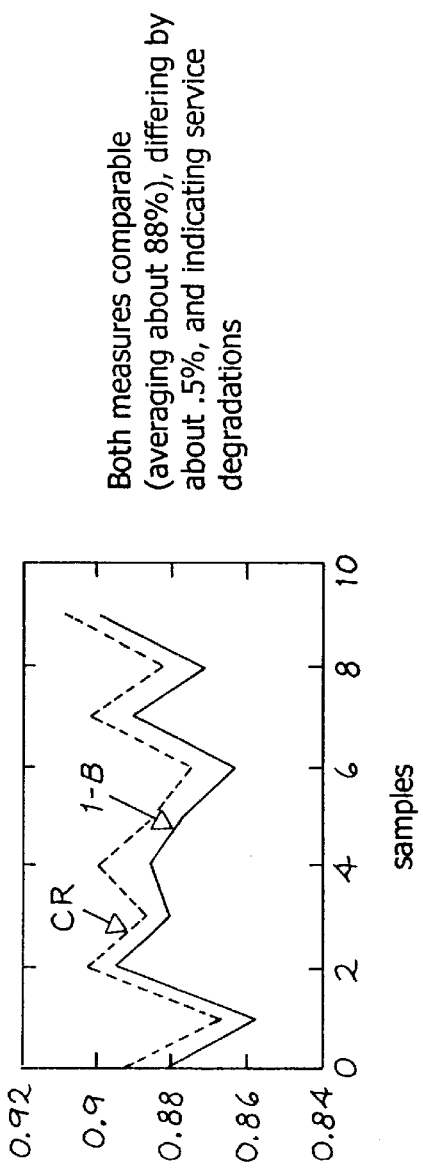
Fig. 4A

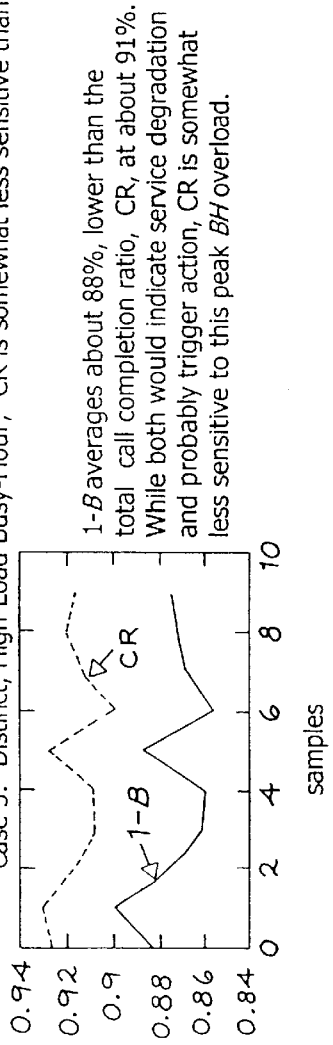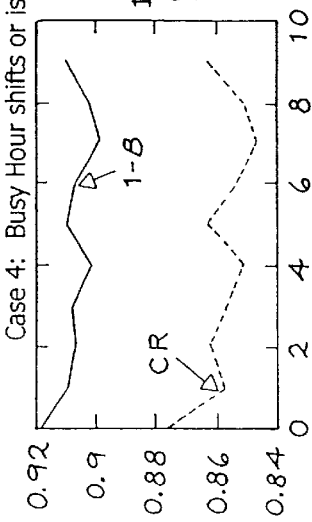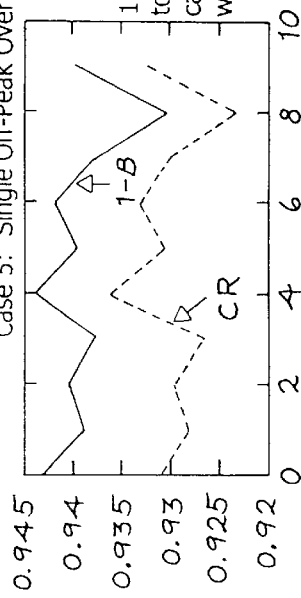
Fig. 4B

Examples with "Fail" as Outcome

Example 1:

ILEC has high daily CR's, $CR_{CLEC}$ is persistently and significantly lower than $CR_{ILEC}$
$CR_{ILEC} = 99.4$, $CR_{CLEC} = 73.2$
$\delta = 26.2, \sigma_{CUT} = 1.198, \sigma = .286, T = 2.092$
Test Fails since $CR_{CLEC} < 97, \delta > T, \sigma < \sigma_{CUT}$

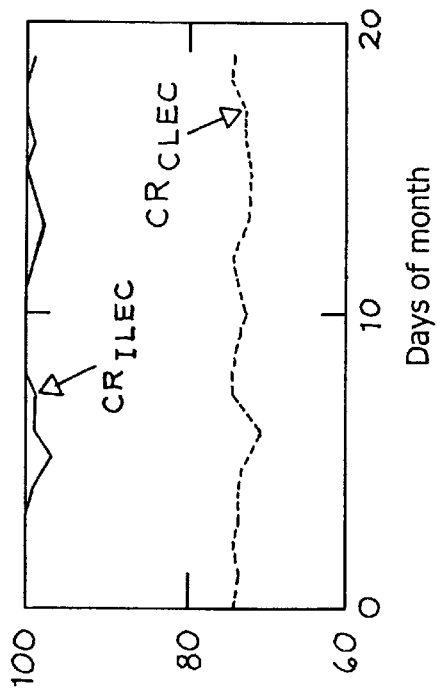

Example 2:

Both companies have high daily CR's. But $CR_{CLEC}$ is persistently and significantly lower than $CR_{ILEC}$
$CR_{ILEC} = 97.8$, $CR_{CLEC} = 95.2$,
$\delta = 2.6, \sigma_{CUT} = 1.198, \sigma = .756, T = 2.24$
Test Fails since $CR_{CLEC} < 97, \delta > T, \sigma < \sigma_{CUT}$

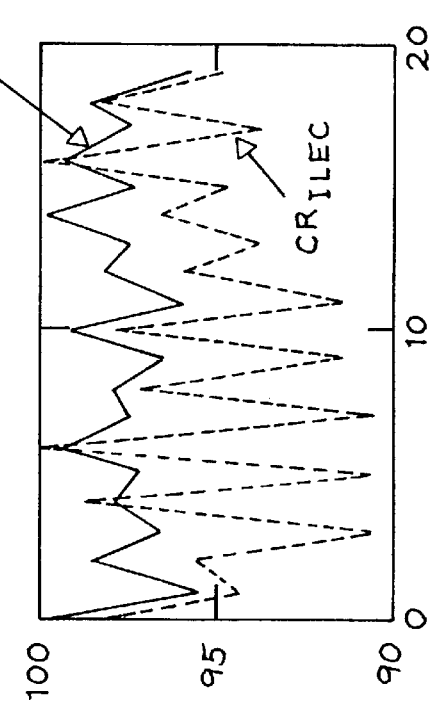

Fig. 8

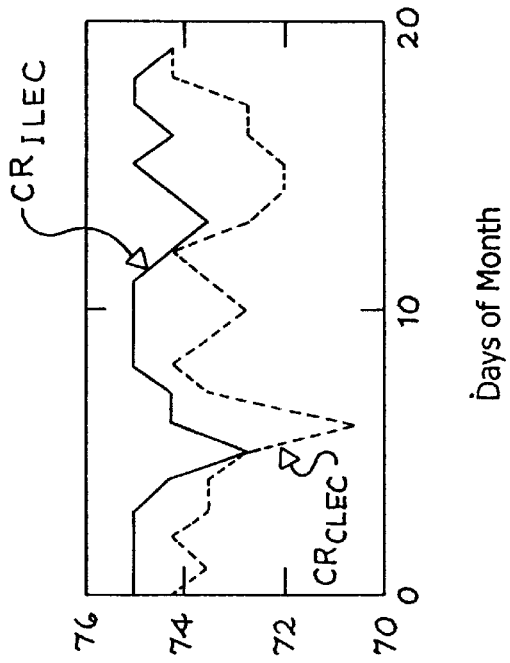
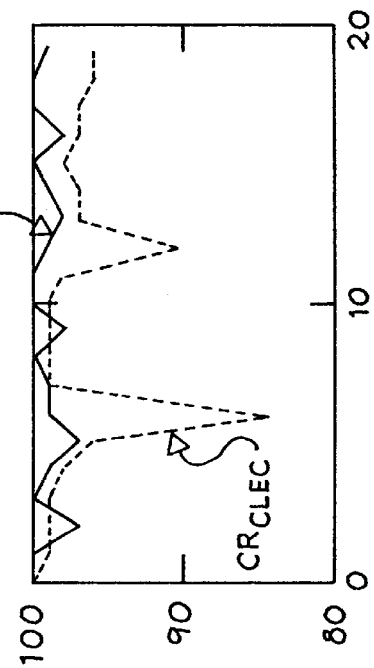

Example 2:

Both Companies have low daily CR's, but $CR_{CLEC}$ is slightly lower than $CR_{ILEC}$, and somewhat more variable. $CR_{ILEC} = 74.5$, $CR_{CLEC} = 73.2$, $\delta = 1.3$, $\sigma_{CUT} = 1.198$, $\sigma = .259$, $T = 2.083$
Test Passes since $CR_{CLEC} < 97$, $\delta < T$, $\sigma < \sigma_{CUT}$ Example 3:

Most CR's near 100%. Two days with somewhat low CLEC CR's (85-90%). $CR_{ILEC} = 99.1$, $CR_{CLEC} = 96.8$, $\delta = 2.25$, $\sigma_{CUT} = 1.198$, $\sigma = .86$, $T = 2.3$
Test Passes since $CR_{CLEC} < 97$, $\delta < T$, $\sigma < \sigma_{CUT}$

Fig. 9B

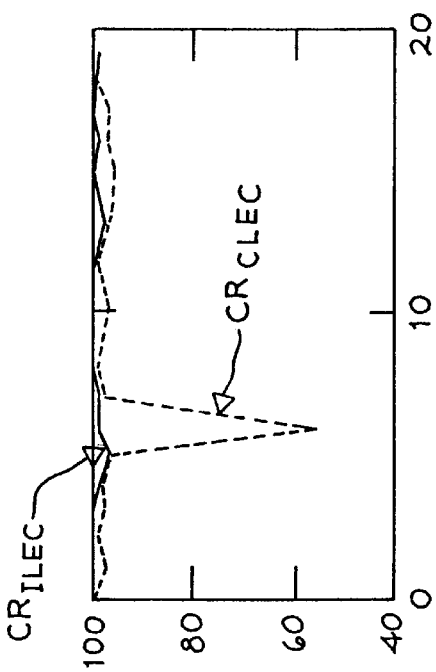
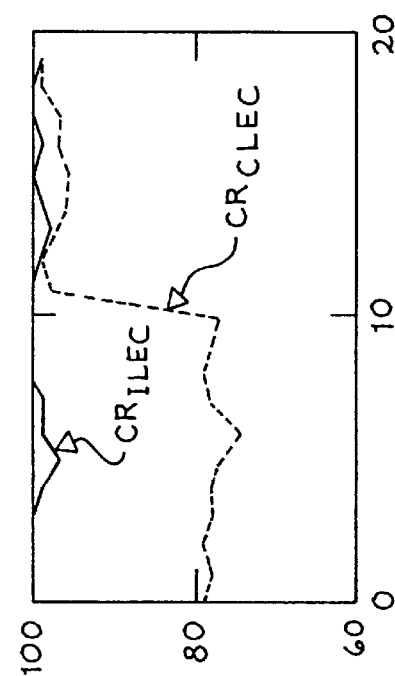

Fig. 10

Examples with "Indeterminate" as Outcome

Example 1:
Most CR's near 100%. One day with low CLEC CR (about 60%).
$CR_{ILEC}= 99.4$, $CR_{CLEC} = 95.7$,
$\delta = 3.7$, $\sigma_{CUT} = 1.198$, $\sigma = 2.061$, $T = 2.663$
Test *Indeterminate* since $\sigma > \sigma_{CUT}$ Example 2:
$CR_{CLEC}$ is low (80%) for half the period. Most other CR's near 100%.
$CR_{ILEC}= 99.4$, $CR_{CLEC} = 86.65$,
$\delta = 12.75$, $\sigma_{CUT} = 1.198$, $\sigma = 2.289$, $T = 2.736$
Test *Indeterminate* since $\sigma > \sigma_{CUT}$ (even though $\delta > T$). In fact, the problem seems to have been addressed.

METHOD FOR MEASURING NETWORK PERFORMANCE PARITY

FIELD OF INVENTION

The present invention relates to a method for measuring the performance of a telecommunications network. More specifically, it relates to a method for measuring the performance parity of a telecommunications network involving an Incumbent Local Exchange Carrier ("ILEC") and at least one Competitive Local Exchange Carrier ("CLEC").

BACKGROUND OF THE INVENTION

Many Incumbent Local Exchange Carriers ("ILECs") desire to gain entry into the Inter-Local Access Transport Area ("LATA") telecommunications business within their own region. In order to gain such entry, an ILEC must demonstrate that it has been equitable in providing interconnection services to Competitive Local Exchange Carriers ("CLECs"). Typically, the interconnection services provided to CLECs are measured, at least in part, through the network performance of the ILEC. In other words, ILECs are required to demonstrate that the interconnection services provided to CLECs are statistically comparable to the services the ILECs provide to their retail end users.

Presently, the methodology for measuring network performance parity with respect to interconnection between ILECs and CLECs is based on busy-hour trunk blocking statistics. Busy-hour trunk blocking relies on the percentage of calls that are not completed (i.e., are "blocked") on a trunk group final in its respective busy hour, where a busy hour is defined to be the hour with the largest amount of trunk group "demand" (i.e., load). For more information on busy-hour trunk blocking statistics, see "Trunk Traffic Engineering Concepts and Application," Bellcore SR-TAP-000191, Issue 2, Dec. 1989, specifically incorporated herein by reference.

There are both technical and historical reasons why networks have traditionally been engineered to achieve a specified "busy-hour blocking" objective on trunk group finals. Until the mid-1980's (i.e., AT&T divestiture), the Public Switched Telephone Network ("PSTN") was focused on very few services (i.e., Plain Old Telephone Service ("POTS"), 800, and other voice-oriented applications) offered by essentially one company (i.e., AT&T and its sibling Bell Operating Companies). In addition, the traffic routing was almost always hierarchical, with routing changing very slowly, if at all. Also, the trunk group (and network) "busy hours" were sharply defined (i.e., much greater load than any other hour of the day), and the associated engineering methodologies, including Neal-Wilkinson Engineering, were well-understood, based on commonly-available measurements, and implemented in existing operations systems for telecommunication.

Today, in contrast to these conditions, the PSTN is a highly diversified arena, with many CLECs and wireless companies providing access services, including fast growing Internet access. The ILECs and CLECs may also differ in their respective network or service "busy hours," sometimes on shared groups, significantly complicating engineering and service management. While the busy-hour trunk blocking statistic is still important in engineering networks, it is intended to be used as an engineering tool, rather than a quality of customer service measure, since traffic blocked on a trunk group is often alternate-routed to another trunk group and completed. Thus, busy-hour trunk blocking statistics do not indicate the actual call disposition, in view of the fact that calls may be blocked on some trunk groups, yet eventually carried (i.e., completed) on other groups. This is especially true, given that network management controls are regularly utilizing "non-hierarchical" or "out-of-chain" routes to improve call completions and customer service. In addition, marketing strategies by ILECs, CLECs and Interexchange Carriers ("IXCs") are increasing and spreading the PSTN demands across the day, especially in "non-peak" hours, to create, essentially, "busy days" instead of "busy hours." Thus, trunk blockage reports miss traffic that might be blocked during hours other than the "busy hour." As a result, busy-hour trunk group blocking does not accurately assess the quality of customer service.

Accordingly, it would be desirable to provide a new methodology for measuring network performance parity that overcomes the disadvantages of the prior art and is innovative, accurate, fair and simple to use, especially in the multi-company arena of the present day PSTN. It would also be desirable to provide a performance measure that is sensitive to a variety of outage and overload situations. In addition, it would be desirable to have a parity metric that is based on classical statistics theory and consistent with assumptions underlying other widely-accepted tariffs and performance measures in the telecommunications industry. Moreover, it would be desirable to provide a new methodology for measuring network performance parity that incorporates meaningful measures of customer service and is based on call completion, rather than trunk blocking statistics. Finally, it would also be desirable to have a parity metric that encourages cooperative business behaviors, by the ILECs and each of their CLECs, that can result in high-quality access services at reasonable costs.

SUMMARY OF THE INVENTION

The present invention provides a method for measuring network performance parity comprising the steps of computing a call completion ratio for at least one network provider, and determining whether the call completion ratio passes a first test. The method also comprises the step of assessing whether a second test is determinate if the call completion ratio does not pass the first test. The method of the present invention further comprises the step of assessing whether the call completion ratio passes the second test if the second test is determinate.

In addition, the present invention provides another method for measuring network performance parity comprising the steps of computing a first call completion ratio for a first network provider, a second call completion ratio for a second network provider, a difference between the first call completion ratio and the second call completion ratio, and a variance for the difference. The method also comprises the steps of determining whether the first call completion ratio or the difference passes an initial test, and whether the variance is greater than a variance cutoff if the initial test is not passed. Moreover, the method comprises the step of determining whether the difference is greater than a threshold if the variance is not greater than the variance cutoff.

BRIEF DESCRIPTION OF THE DRAWINGS

FIG. 3 is a graphical representation of three examples illustrating possible outcomes for the parity test and method of FIG. 2.

FIGS. 4A–4B are graphical representations of five cases illustrating advantages of the parity test and method of FIG. 2 over the prior art.

FIG. 8 is a graphical representation of two examples illustrating a FAIL outcome for the parity test and method of FIG. 5.

FIGS. 9A–9B are graphical representations of three examples illustrating a PASS outcome for the parity test and method of FIG. 5.

FIG. 10 is a graphical representation of two examples illustrating an INDETERMINATE outcome for the parity test and method of FIG. 5.

DETAILED DESCRIPTION OF PREFERRED EMBODIMENTS

Figure 1:
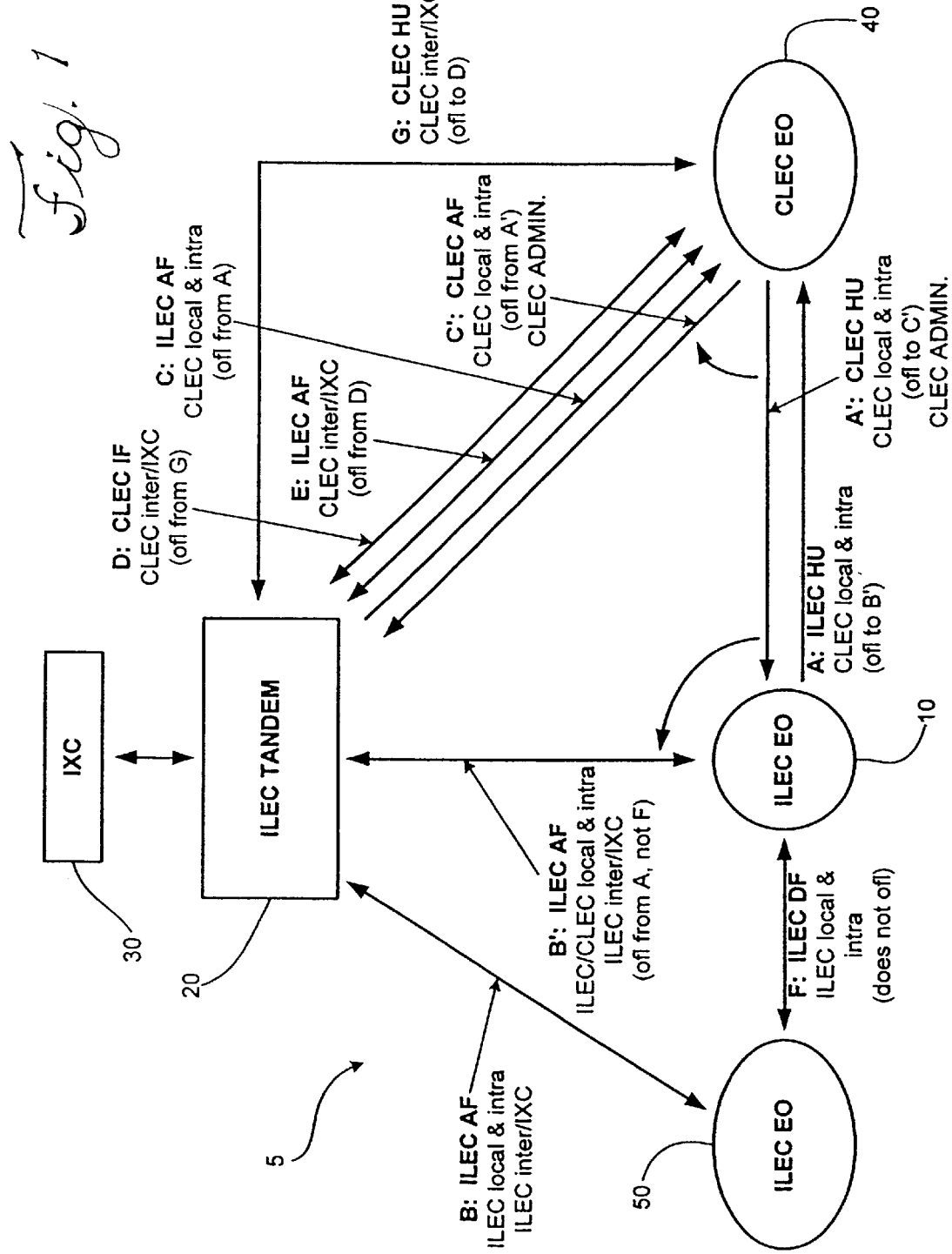
FIG. 1 is a block diagram illustrating a preferred network for ILEC, CLEC, and IXC telecommunications.

Turning now to the drawings, FIG. 1 shows a preferred network 5 for ILEC and CLEC local, intra-LATA (i.e., toll required), and inter-LATA or IXC communications, with comparable network arrangements ("CNAs") for the ILEC and the CLEC. The preferred network 5 comprises a first ILEC End Office ("EO") 10, an ILEC tandem 20, an IXC provider 30, a CLEC EO 40, and a second ILEC EO 50. It should be understood, however, that the preferred network 5 may have any number of different configurations, with more or fewer components than those identified and described herein, depending on the application, as well as operating and consumer preferences. For example, the first ILEC EO 10 and the second ILEC EO 50 may be combined to form one overall ILEC EO, rather than two separate ILEC EOs, as shown in FIG. 1.

The first ILEC EO 10 is connected to the CLEC EO 40 through a pair of high usage ("HU") trunk groups A, A'. These trunk groups A, A' may be either primary (i.e., give overflow, but do not receive overflow) or intermediate (i.e., give and receive overflow) HU-type trunk groups. Since both types of HU trunk groups give overflow, calls not carried on these trunk groups may overflow to alternate trunk groups. Preferably, the trunk group A is provided by the ILEC for local and intra-LATA CLEC communications from the first ILEC EO 10 to the CLEC EO 40. The A' trunk group is preferably provided and administered by the CLEC for local and intra-LATA CLEC communications from the CLEC EO 40 to the first ILEC EO 10.

As shown in FIG. 1, the first ILEC EO 10 is also connected to the second ILEC EO 50 through a direct final ("DF") trunk group F. Since the trunk group F is a DF, the trunk group F does not automatically give overflow, and therefore, calls may be blocked. The trunk group F is preferably provided by the ILEC for local and intra-LATA ILEC communications between the first ILEC EO 10 and the second ILEC EO 50. The second ILEC EO 50 is also connected to the ILEC tandem 20 through an alternate final ("AF") trunk group B. Since the trunk group B is an AF, the trunk group B may receive overflow, but does not automatically give overflow, and therefore, calls may also be blocked. Preferably, the trunk group B is provided by the ILEC for local and intra-LATA ILEC communications, as well as inter-LATA or IXC communications, between the second ILEC EO 50 and the ILEC tandem 20, which is connected to the first ILEC EO 10, the IXC provider 30, and the CLEC EO 40.

In addition, the first ILEC EO 10 is connected to the ILEC tandem 20 through an alternate final ("AF") trunk group B'. Since the trunk group B' is an AF, the trunk group B' may receive overflow, but does not automatically give overflow, and therefore, calls may also be blocked. Preferably, the trunk group B' is provided by the ILEC for local and intra-LATA ILEC/CLEC communications, as well as inter-LATA or IXC communications, between the first ILEC EO 10 and the ILEC tandem 20, which is connected to the second ILEC EO 50, the IXC provider 30, and the CLEC EO 40.

As shown in FIG. 1, the CLEC EO 40 is connected to the ILEC tandem through a pair of AF trunk groups C, C'. As AFs, the trunk groups C, C' may receive overflow, but do not automatically give overflow, and therefore calls may be blocked. Preferably, the trunk group C is provided by the ILEC for local and intra-LATA CLEC communications from the ILEC tandem 20 to the CLEC EO 40. The C' trunk group is preferably provided and administered by the CLEC for local and intra-LATA CLEC communications from the CLEC EO 40 to the ILEC tandem 20.

The CLEC EO 40 is also connected to the ILEC tandem through an intermediate final ("IF") trunk group D, an AF trunk group E, and an HU trunk group G. As an IF, the trunk group D both gives and receives overflow, while the trunk group E, as an AF, receives overflow, but does not automatically give overflow. As a result, calls may be blocked on trunk group E, but not on trunk group D. Preferably, the trunk group D is provided by the CLEC for inter-LATA or IXC CLEC communications between the ILEC tandem 20 (and thus the IXC provider 30) and the CLEC EO 40. Similarly, the trunk group E is preferably provided by the ILEC for inter-LATA or IXC CLEC communications between the ILEC tandem 20 (and thus the IXC provider 30) and the CLEC EO 40. Like the trunk groups A, A', the trunk group G may be either a primary (i.e., gives overflow, but does not receive overflow) or an intermediate (i.e., gives and receives overflow) HU-type trunk group that may overflow to alternate trunk groups.

The hierarchical traffic routes for the preferred network 5 will now be described with reference to FIG. 1. With respect to the first ILEC EO 10, local and intra-LATA CLEC communication traffic is routed between the first ILEC EO 10 and the CLEC EO 40 along the HU trunk groups A, A'. Those calls that cannot be carried (i.e., are blocked) by the trunk groups A, A', overflow (i.e., are alternate-routed) to the trunk groups B', C, C' according to a predetermined hierarchical rerouting plan. For instance, if a local or intra-LATA call from the ILEC EO 10 is blocked on the trunk group A, then the call overflows and is alternate-routed to the CLEC EO 40 through the trunk group B', the ILEC tandem 20, and the trunk group C. Likewise, if a local or intra-LATA call from the CLEC EO 40 is blocked on the trunk group A', then the call overflows and is alternate-routed to the ILEC EO 10 through the trunk group C', the ILEC tandem 20, and the direct connection between the first ILEC EO 10 and the ILEC tandem 20, i.e., the trunk group B'.

With respect to the CLEC EO 40, inter-LATA or IXC CLEC communication traffic is routed between the CLEC EO 40 and the ILEC tandem 20 which is connected to the IXC provider 30, along the HU trunk group G. Those calls that cannot be carried (i.e., are blocked) by the trunk group G, overflow (i.e., are alternate-routed) to the IF trunk group D, or alternatively to the AF trunk group E, according to a predetermined hierarchical routing plan. For instance, if an inter-LATA or IXC call from the CLEC EO 40 is blocked on the trunk group G, then the call overflows and is alternate-routed to the ILEC tandem 20 through the IF trunk group D. Alternatively, if the call is further blocked on the IF trunk group D, the call may be further routed to the ILEC tandem 20 through the AF trunk group E. The same is true for inter-LATA or IXC CLEC communication traffic from the IXC provider 30 to the CLEC EO 40 through the ILEC tandem 20.

While uncompleted calls on trunk groups B, B', C, C', E, and F (i.e., an AF or DF trunk group) do not automatically overflow, and therefore may be blocked, network management may determine a way to ultimately complete the "blocked" calls. By using conventional non-hierarchical (out-of-chain) routing, network management may be able to complete some, if not all, of the calls blocked in the hierarchical routing scheme. Accordingly, a measure of call completion, rather than trunk group blocking, more accurately reflects the quality of customer service provided by the ILEC to its retail end users, the CLEC, and the customers of the CLEC.

As a result of the above hierarchical traffic routing, CNAs are formed among the trunk groups for the ILEC and CLEC communications. For instance, ILEC trunk group F is comparable with trunk groups C and C' carrying CLEC traffic, and ILEC trunk groups B and B' are comparable with trunk groups D and E carrying CLEC traffic. In other words, the traffic mix and function of trunk groups F and B, B' are similar (i.e., comparable) to the traffic mix and function of trunk groups C, C' and D, E, respectively.

Figure 2:
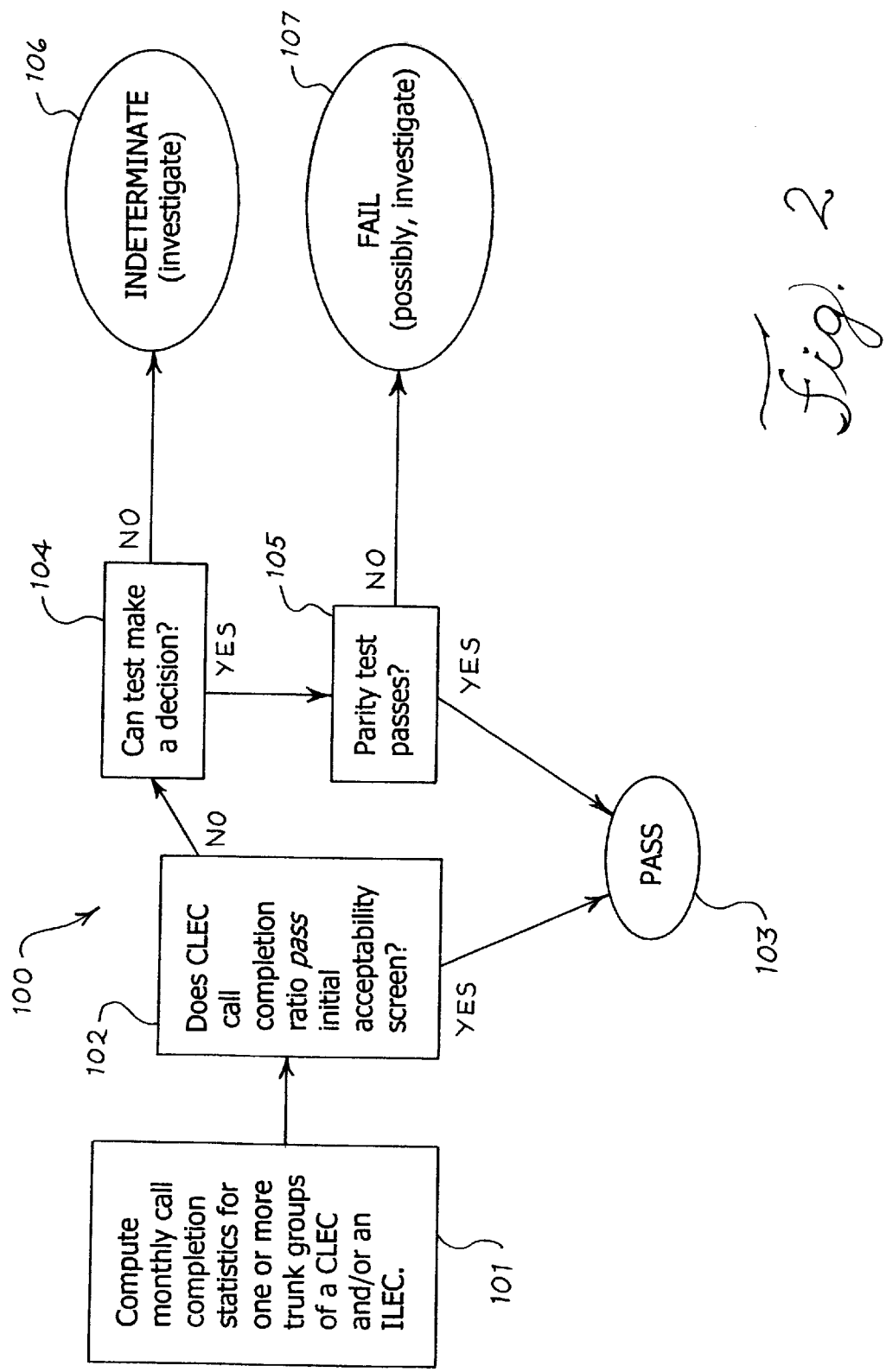
FIG. 2 is a flow chart illustrating a preferred embodiment of a method of the present invention with a parity test for measuring network performance parity.

FIG. 2 shows an overview of a preferred embodiment of a method 100 of the present invention that uses a parity test (or parity metric) for measuring relative network performance parity. Preferably, the method 100 of the present invention is used to measure the performance parity of the CNAs described above. By measuring performance parity among CNAs, the method 100 of the present invention is able to maximize the accuracy and usefulness of its results. It should be understood, however, that the method 100 of the present invention may be used to measure the performance parity of other CNAs or network arrangements that are not comparable, or a combination of CNAs and non-comparable network arrangements, and the method 100 of the present invention is not limited to measuring the performance parity of only the CNAs previously described.

As shown in FIG. 2, the method 100 of the present invention begins with Step 101, wherein the call completion statistics for one or more trunk groups are computed for a given period of time. Preferably, the call completion statistics for each CNA of the ILEC and the CLEC are computed as a percentage or ratio and analyzed together on a monthly basis. The monthly basis may be a business month, covering aggregated daily call completion statistics for each day in a 20-day period.

The daily call completion percentage or ratio ("CR") for one or more trunk groups (e.g., a CNA) may be computed with the following equation:

$$CR = \frac{\text{call attempts} - (\text{blocked calls} - \text{successful reroutes})}{\text{call attempts}},$$

where CR may be stated as a fraction or a percentage. In this preferred equation, "call attempts" represents the total number of call attempts for a trunk group or set of trunk groups, "blocked calls" represents the total number of calls blocked by the trunk group or set of trunk groups within a hierarchical rerouting scheme, and "successful reroutes" represents the total number of calls successfully completed through rerouting outside of the hierarchical routing scheme. Preferably, the "call attempts" and "blocked calls" include only those call attempts and blocked calls, respectively, on the hierarchical or "in-chain" final trunk groups. As an example, if 1000 call attempts were made on one or more final trunk groups, with 100 calls being blocked within the hierarchical routing scheme, but 70 calls being successfully completed and rerouted outside of the hierarchical routing scheme, the CR for the one or more trunk groups would equal 0.97 or 97%. It should be understood that if there were no "successful reroutes," then the CR is essentially the same as the complement of the "blocked calls" (i.e., 1-B), which is discussed in more detail below.

The next step of the method 100 is Step 102, which tests whether the CR for the CLEC trunk group or set of trunk groups passes an initial acceptability screen. In Step 102, the CR for the CLEC trunk group or set of trunk groups is compared with the CR for the CNA of the ILEC. If the CLEC CR exceeds or is consistent with that of the ILEC, then performance parity is achieved and the test declares a PASS 103, as shown in FIG. 2. The CR may also be compared to CRs based on other tests or factors, such as a CR based on known engineering objectives for the CLEC trunk group or set of trunk groups. For instance, if the CLEC CR exceeds or is consistent with a CR based on known engineering objectives, then performance parity is also achieved and a PASS 103 is declared.

Once a PASS 103 is declared by the initial acceptability screen test of Step 102, network performance parity is achieved, and the method 100 of the present invention need not proceed any further. If a PASS 103 is not declared by the initial acceptability screen test of Step 102, however, because the CR for the CLEC trunk group or set of trunk groups does not exceed or is not consistent with the CR of the CNA of the ILEC or another CR, such as the CR based on known engineering objectives, then further testing must be done in Steps 104 and 105. In Step 104, a determination is made of whether the parity test of the present invention is capable of making a decision (i.e., is determinate). If the variance, $\sigma^2$, of an average difference between the ILEC and CLEC CRs, $\delta$, is so large that the test design parameters cannot be met, i.e., the "noise" exceeds the "signal," the parity test is unable to make a decision (i.e., is not determinate) with respect to the performance parity between the CLEC and the ILEC CNAs. As a result, the parity test yields an INDETERMINATE outcome 106, as shown in FIG. 2. The INDETERMINATE outcome 106 may require an investigation by either the CLEC, the ILEC, or both, into the causes of the large variance to determine the proper course of action that should be taken in response. Such an investigation may reveal that the large variance was caused by highly volatile or unforecasted demands, network outages or overloads, marketing and sales campaigns, or other unusual events beyond the control of the ILEC and/or CLEC, rather than insufficient network resources. Accordingly, investigating the causes of the large variance may prevent the unnecessary provisioning of extra (or "reserve") trunks and expenditures by the ILEC and/or CLEC.

On the other hand, if the parity test of the present invention is able to make a decision (i.e., is determinate) with respect to the performance parity between the ILEC and CLEC CNAs (i.e., the variance is small enough), the parity test is run to see if it "passes" in Step 105. In Step 105, the parity test compares an average difference between the ILEC and CLEC CRs, $\delta$, with a threshold, T, where T depends on both a variance, $\sigma^2$, of the average difference and several test design parameters, including a "false alarm (Type I)" objective, $\alpha$, a "miss (Type II)" objective, $\beta$, and a null or alternate hypothesis of the average difference, $\Delta$. Preferably, $\alpha$, $\beta$ and $\Delta$ are chosen to be consistent with the assumptions in known equal-access blocking performance tables. The parity test of the present invention is described in more detail below with reference to specific examples of its implementation. The parity test "passes" in Step 105 when the average difference between the ILEC and CLEC CRs, $\delta$, is less than or equal to the threshold, T. If the parity test "passes," then a PASS 103 is declared and the method 100 of the present invention is completed. In contrast, if the average difference between the ILEC and CLEC CRs, $\delta$, is greater than the threshold, T, the parity test does not pass in Step 105, and a FAIL 107 is declared. Similar to the INDETERMINATE outcome 106, a FAIL 107 preferably requires an investigation of its causes by either the ILEC, the CLEC, or both, to determine the cause of the difference in performance, since the ILEC is only responsible for causes within its control. An investigation by the ILEC and/or the CLEC helps to expedite reasonable corrective actions, consistent with the known policy of proactively servicing network problems. Such reasonable corrective actions may include increasing network capacity by the ILEC and/or the CLEC.

FIG. 3 shows three examples illustrating the possible outcomes for the parity test and method 100 of the present invention. In Example 1 of FIG. 3, the ILEC CR is near 100% for an entire 20-day business month, while the CLEC CR is just below 80% for the same month. This relatively large average difference (i.e., over 20%) between the ILEC and CLEC CRs, $\delta$, is illustrative of the FAIL 107 outcome, with no performance parity being achieved. In Example 2 of FIG. 3, however, the ILEC CR is about 99% for an entire 20-day business month, while the CLEC CR is about 98% for the same month. This relatively small average difference (i.e., 1%) between the ILEC and CLEC CRs, $\delta$, is illustrative of the PASS 103 outcome, with performance parity being achieved. Finally, in Example 3 of FIG. 3, the ILEC CR is near 100% for an entire 20-day business month, while the CLEC CR is also near 100% for most of the same month, except for a few days where the CLEC CR dropped down eventually to less than 60%. This relatively large variance, $\sigma^2$, in the CLEC CR is illustrative of the INDETERMINATE outcome 106, with the performance parity outcome incapable of being determined.

FIGS. 4A–4B illustrate some of the advantages of using the method of the present invention based on a CR measure compared to the traditional trunk group busy-hour blocking measure. In each of the five cases shown in FIGS. 4A–4B, the loads and associated blocking statistics on a collection of 100-trunk final groups were replicated for each hour in each day of a 20-day business month. Each of the five cases shown in FIGS. 4A–4B illustrates call completion results for ten different samples. In order to properly illustrate the performance measuring effects of the present method based on CRs compared to the trunk group busy-hour blocking of the prior art, offered loads of about 100 Erlangs were used for each of the five cases. As is well-known, an Erlang is a unit of traffic demand, with one Erlang being the maximum load that can possibly be handled by one trunk in any given period of time (typically one hour). For instance, a trunk group with 100 call attempts during an hour and average call holding time of 1/20 of an hour (i.e., 5 minutes) would have 100×(1/20)=5 Erlangs of offered traffic in that hour.

In each of the five cases shown in FIGS. 4A–4B, a trunk group's average total CR for each day of a 20-day period is graphed together with the trunk group's busy hour ("BH") call completion ratio, 1-B, where B is the daily, preferably unweighted, blockings in the hour with the greatest offered loads over the same period of time. The "lower" curve in each graph corresponds to the performance measure (i.e., CR or 1-B) that is more sensitive to overloads for that case. For example, as shown in case 1 of FIG. 4A, both the CR and 1-B measures are comparable and reflect generally good service, since they both average in excess of 99% and differ by only about 0.25%. Similarly, in case 2 of FIG. 4A, both the CR and 1-B measures are roughly comparable, since they both average about 88% and differ by only about 0.5%. Both the CR and 1-B measures of case 2, however, indicate service degradations due to overloads in several hours throughout the day (i.e., not just the BH). The service degradations may trigger action on behalf of the ILEC and/or the CLEC, such as augments or increases in network resources, depending on the nature of the service degradation.

Case 3 of FIG. 4B illustrates the effect of a distinct, high-load BH on the CR and 1-B measures. In case 3, the 1-B measure averages about 88%, 3% lower than the CR at about 91%.

The CR measure in case 3 is somewhat less sensitive than the 1-B measure to the distinct, high-load BH, although both the CR and 1-B measures would indicate service degradation and probably trigger action by the ILEC and/or the CLEC.

Case 4 of FIG. 4B illustrates the effect of an overloaded BH that has shifted or spread out on the CR and 1-B measures. In case 4, the 1-B measure averages about 91%, 5% higher than the CR at about 86%. Unlike case 3, the 1-B measure in case 4 is far less sensitive than the CR measure to the BH shift or spread. In fact, since the BH has shifted or spread out, the 1-B measure has essentially missed the resulting network overload. Similarly, in case 5 of FIG. 4B, the 1-B measure misses a single off-peak (i.e., non-BH) overload of 1000 Erlangs, while the CR measure captures the overload. In case 5, the 1-B measure averages about 94%, 1.5% higher than the CR at about 92.5%. Like case 4, the 1-B measure in case 5 is less sensitive than the CR measure to the single off-peak overload of 1000 Erlangs.

Figure 5:
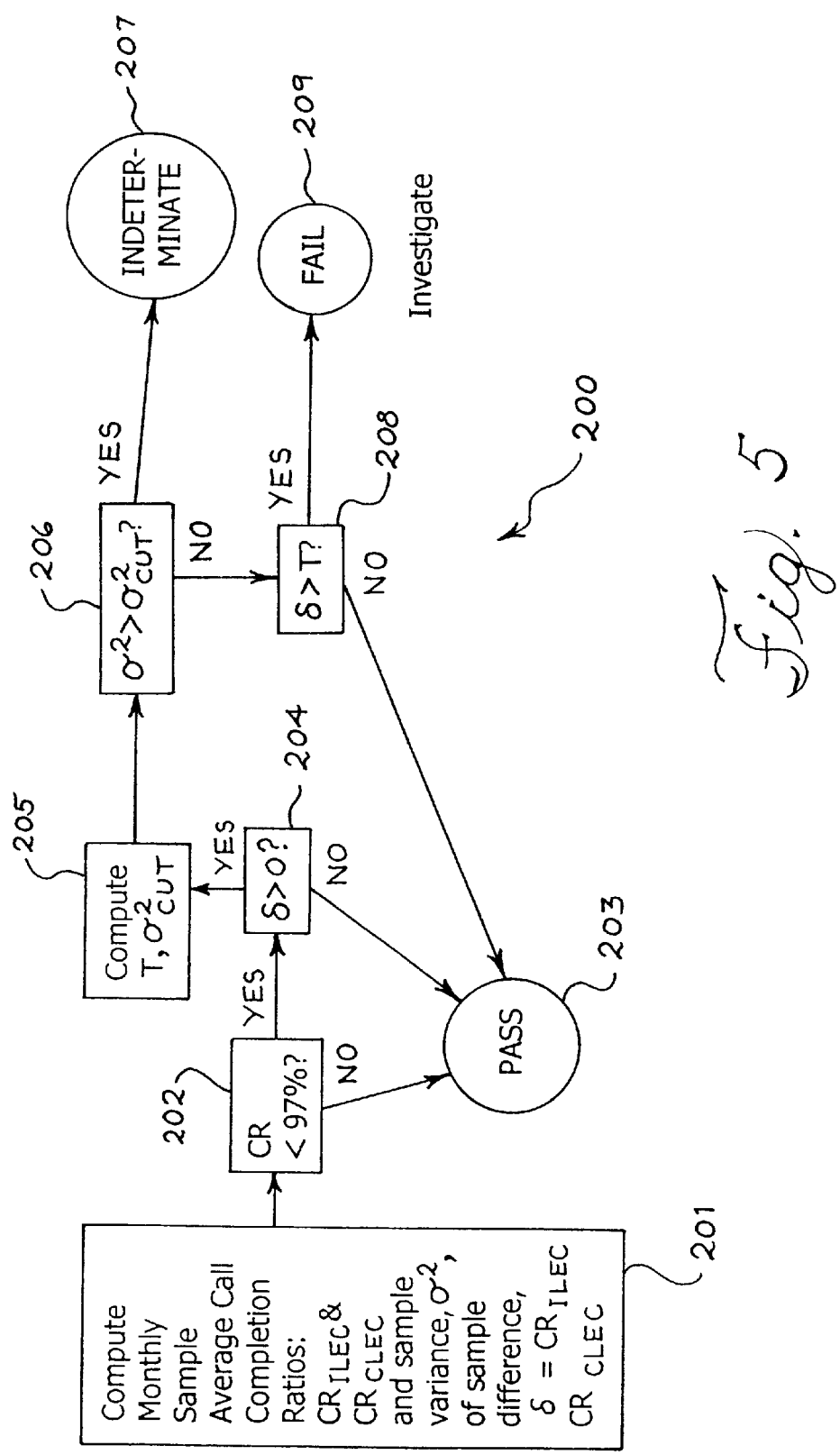
FIG. 5 is a flow chart illustrating an exemplary embodiment of the parity test and method of FIG. 2.

FIG. 5 shows an exemplary embodiment of the method and its parity test (or parity metric) of the present invention (see FIG. 2) for comparing ILEC and CLEC CNAs. While only one CNA and its CR is used for each of the ILEC and CLEC, it should be understood that these CNAs may well represent multiple CNAs or a subset of the available ILEC and CLEC CNAs. The method 200 shown in FIG. 5 begins with Step 201, wherein the average CR for the ILEC ("$CR_{ILEC}$") and the CR for the CLEC ("$CR_{CLEC}$") are computed for a given period of time, such as a 20-day business month. The sample difference, $\delta$, and the sample variance, $\sigma^2$, of the sample difference, is also computed in Step 201. The sample difference, $\delta$, may be computed by subtracting the $CR_{CLEC}$ from the $CR_{ILEC}$ (i.e., $\delta = CR_{ILEC} - CR_{CLEC}$). The sample variance, $\sigma^2$, may be computed with the following equation:

$$\sigma^2 = \left( \frac{\sigma^2_{ILEC}}{n_{ILEC}} + \frac{\sigma^2_{CLEC}}{n_{CLEC}} \right)$$

In this equation, $\sigma_{ILEC}^2$ and $\sigma_{CLEC}^2$ are the variances for the ILEC and CLEC CNAs, respectively. Also, the $n_{ILEC}$ and the $n_{CLEC}$ are the time periods or number of business days used in the calculation of the $CR_{ILEC}$ and $CR_{CLEC}$, respectively. A key attribute of the sample variance, $\sigma^2$, is that it will be small for CNAs with very consistent performance measures. If the sample variance, $\sigma^2$, is small and the sample difference, $\delta$, is also small, then parity between the ILEC and CLEC CNAs has generally been achieved, as described in more detail below. On the other hand, if the sample variance, $\sigma^2$, is small and the sample difference, $\delta$, is large, then parity between the ILEC and CLEC CNAs has generally not been significantly achieved, as also described in more detail below.

The next step of the method 200 is Step 202, which tests whether the $CR_{CLEC}$ is less than an initial acceptance-screen value. As shown in FIG. 5, this value is preferably 97%, since 97% is consistent with documented and accepted engineering thresholds. For instance, according to well-accepted practices, a null hypothesis of 1% average blocking and an alternative hypothesis of 5% average blocking are common engineering objectives for trunk group finals. The alternative hypothesis of 5% is consistent with time-tested (i.e., nearly 50 years) of industry experience that small differences in observed blocking (i.e., 1–3%) do not trigger customer complaints, but that differences on the order of 4–5% or more should be avoided. Almost any reasonable statistical test attempting to distinguish these two objectives would choose a threshold roughly halfway between the two, or at about 3%, thereby leaving an acceptable engineering objective for CRs of 97%. The same conclusion was reached in the Committee T1 Report No. 11 (June 1991) and Bellcore SR STS-000317 (September 1990), both of which are specifically incorporated in their entirety herein by reference.

In Step 202, if the $CR_{CLEC}$ is equal to or exceeds 97%, then performance parity is achieved and a PASS 203 is declared, as shown in FIG. 5. If the $CR_{CLEC}$ is less than 97%, however, then the method 200 continues with Step 204, where the sample difference, $\delta$, is tested to see if it is positive, negative, or zero. In Step 204, if the sample difference, $\delta$, is less than zero (i.e., negative) or equal to zero, then performance parity is achieved and a PASS 203 is declared, as shown in FIG. 5, since the $CR_{CLEC}$ is greater than, or at least equal to, the $CR_{ILEC}$. On the other hand, if the sample difference, $\delta$, is greater than zero (i.e., positive), then performance parity may or may not be achieved, since the $CR_{CLEC}$ is less than the $CR_{ILEC}$.

Figure 7:
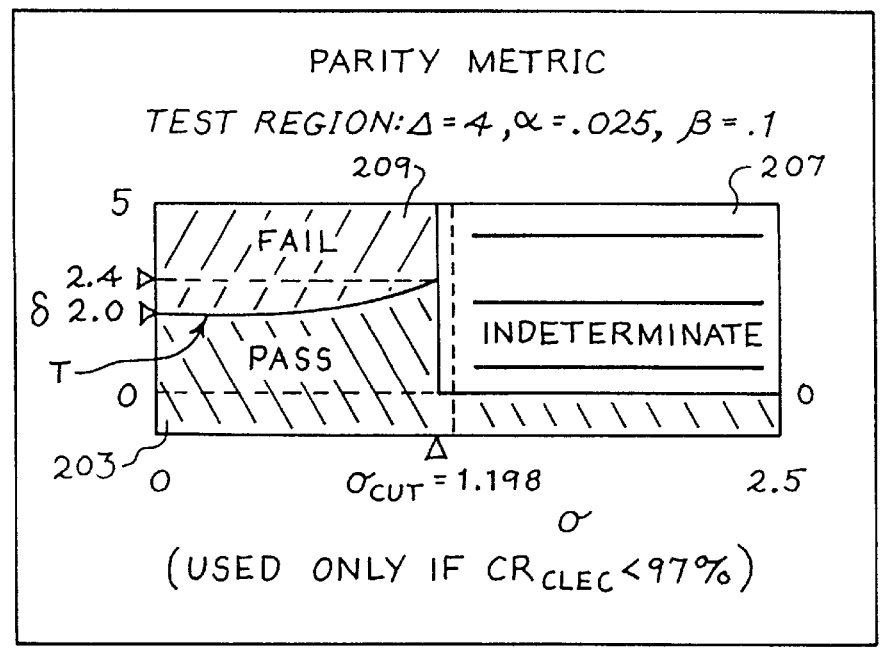
FIG. 7 is a graphical representation of the parity metric of the method of FIG. 5.

Once a PASS 203 is declared by either Step 202 or Step 204, network performance parity between the ILEC and CLEC is achieved, and the method 200 of the present invention need not proceed any further. If a PASS 203 is not declared by either Step 202 or Step 204, however, then further testing must be done in Steps 205, 206, and 208. In Step 205, a threshold, T, for the sample difference, $\delta$, and a cutoff variance, cut $\sigma_{cut}^2$, for the variance, $\sigma^2$, are computed. In Step 206, the variance, $\sigma^2$, is compared to the variance cutoff, $\sigma_{cut}^2$, in order to determine whether the parity test or metric of the present invention is capable of making a decision (i.e., is determinate). Equivalently, the respective standard deviations ("SD"), $\sigma$ and $\sigma_{cut}$, can be compared. As shown in FIG. 7, the preferred SD cutoff, is 1.198. Accordingly, if the SD, $\sigma$, is greater than the SD cutoff, $\sigma_{cut}$, of 1.198 (i.e., to the right of $\sigma_{cut}$ in FIG. 7), the parity test is unable to make a decision (i.e., is not determinate) with respect to the performance parity between the CLEC and the ILEC CNAs. Consequently, the parity test yields an INDETERMINATE outcome 207, as shown in FIGS. 5 and 7, which is identical to the INDETERMINATE outcome 106, with the same results. As explained below, with a variance, $\sigma^2$, that is so large that the test design parameters (i.e., $\alpha$, $\beta$, $\Delta$) cannot be met, the parity test or metric is unable to make a decision (i.e., is not determinate) with respect to the performance parity between the CLEC and the ILEC CNAs because the "noise" exceeds the "signal." On the other hand, if the parity test of the present invention is able to make a decision (i.e., is determinate) with respect to the performance parity between the ILEC and CLEC CNAs (i.e., the SD, $\sigma$, is less than the preferred SD cutoff, $\sigma_{cut}$, of 1.198), the parity test is run to see if it "passes" in Step 208.

As previously set forth, large values of $\delta$, or large values of an expected value function of $\delta$, $E(\delta)$, might suggest a possible lack of parity, i.e., $E(\delta)>0$. However, when $\sigma^2$ is large (but less than $\sigma_{cut}^2$), a statistical test of whether $E(\delta)$ is greater than zero would allow a "margin of error" proportional to $\sigma$ before such a declaration would be considered statistically significant. Therefore, in many standard statistical inference applications, a resulting hypothesis test would be in the form of two cases. The first case is $\delta \leq T$, where it is concluded that $E(\delta)=0$ (or $E(\delta) \leq 0$), and parity is achieved. The second case is $\delta>T$, where it is concluded that $E(\delta)=\Delta>0$ (where $\Delta$ is a null or alternate hypothesis of the average difference, $\delta$), and parity is not achieved.

Figure 6:
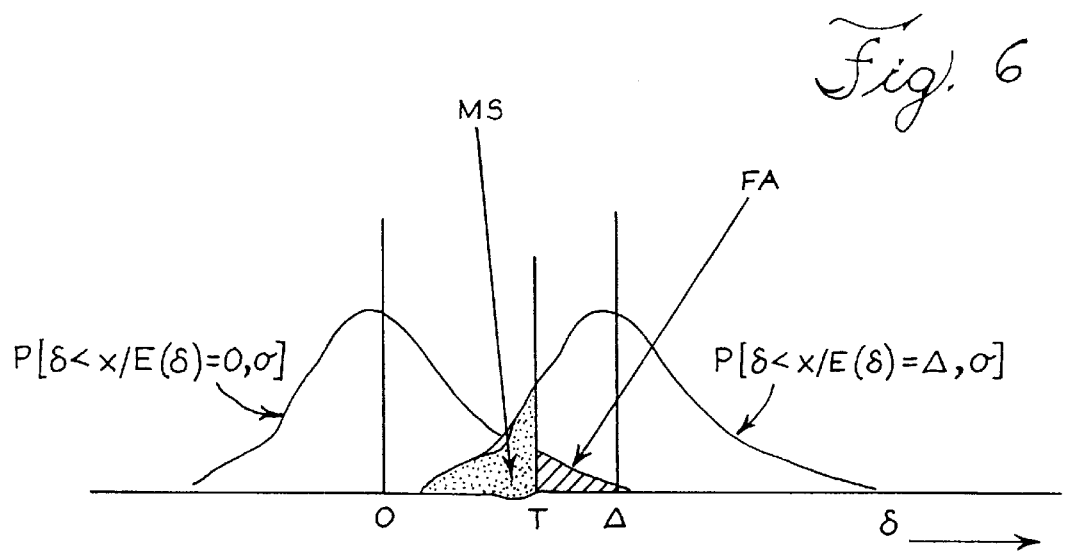
FIG. 6 is a graphical representation of relationships between design parameters for the parity test and method of FIG. 5.

T is a threshold that depends on $\alpha$ and other test design parameters, including the "false alarm (FA)" limit, $\alpha$, and the "miss (MS)" limit, $\beta$. By definition, the FA is the probability that the test declares a "fail" (i.e., $\delta>T$), when in fact $E(\delta)=0$ (or $E(\delta) \leq 0$), and the MS is the probability that the test declares a "pass" (i.e., $\delta \leq T$), when in fact $E(\delta)=\Delta>0$. Mathematically, the FA and the MS may be written as FA=P[$\delta>T|E(\delta)=0$] and MS=P[$\delta \leq 0|E(\delta)=\Delta$], respectively, with test design restrictions that FA<$\alpha$ and MS<$\beta$. Therefore, the key parameters for choosing the threshold, T, are $\alpha$, $\beta$, $\Delta$ and $\sigma$. FIG. 6 shows a graphical representation of the relationships between these parameters, including the FA and the MS, with $\delta$ increasing along the x-axis in the direction of the arrow.

With respect to the relationships among the parameters $\alpha$, $\beta$, $\Delta$, $\sigma$ and the associated test threshold, T, for each set of parameters ($\alpha$, $\beta$, $\Delta$, $\sigma$), there may be many feasible thresholds (i.e., since constraints $\alpha$ and $\beta$ preferably provide bounds on FA and MS, not equalities) or no feasible thresholds (i.e., the requirements are too strict). Keeping the FA limit, $\alpha$, small (i.e., making T larger) tends to raise the likelihood of MS. Similarly, keeping the MS limit, $\beta$, small (i.e., making T smaller) tends to raise the likelihood of FA. Therefore, a reasonable objective is to preferably keep both $\alpha$ and $\beta$ relatively small, i.e., less than or equal to 0.1. In addition, if the alternative hypothesis parameter, $\Delta$, is very small (i.e., a few percent) it may be difficult to achieve design objectives, since, for example, 97% and 99% average CRs may be difficult to distinguish statistically. On the other hand, if $\Delta$ is very large (i.e., 5% or more), there is a risk of poor service since average CRs of 94–96% might "pass" and achieve parity, when they should actually indicate service degradation and possibly trigger action by either the ILEC and/or CLEC. As a result, $\Delta$ is preferably equal to 4, which is also the same alternative hypothesis and time-tested difference that underlies the action thresholds in the well-known equal-access arena (see, e.g., Committee T1Report No. 11 (June 1991) and Bellcore SR STS-000317 (September 1990)).

Feasible thresholds for a given set of parameters, $\alpha$, $\beta$, $\Delta$ and $\sigma$, are all values of T that simultaneously meet the FA<$\beta$ and MS<$\beta$ constraints. This may involve either a numerical search, or, possibly, an analytical solution. Preferably, in the range of interest for $\alpha$, $\beta$ and $\Delta$ that was previously set forth above, T and $\sigma_{cut}$ are computed with the following equations:

$$T \approx \frac{\Delta}{2} + s(\alpha, \beta) * \sigma, \text{ where } s(\alpha, \beta) = 0.232 * \ln\left(\frac{\beta}{\alpha}\right)$$

$$\sigma_{cut} \approx \Delta * (0.184 + 0.923 * (\alpha + \beta))$$

It should be noted that a feasible value of T may only be calculated if $\sigma \leq \sigma_{cut}$. Similarly, with these equations, when $\Delta$ is small, so is $\sigma_{cut}$, which results in few, if any, feasible values of T. In addition, as $\Delta$ increases, $\Delta/2$ becomes the dominant component of T, with an allowance of $s(\alpha,\beta)*\sigma$ for volatility in $\delta$. The allowance is preferably linear in $\sigma$, with a coefficient depending on $\ln(\beta/\alpha)$, and a cutoff at $\sigma_{cut}$. In fact, the allowance is positive, i.e., $s(\alpha,\beta)>0$, only if $\beta>\alpha$. Also, $\sigma_{cut}$ is proportional to $\Delta$, with a dominant coefficient depending on $\alpha+\beta$.

As stated above, a and 0 are preferably small, i.e., less than or equal to 0.1, and $\Delta$ is preferably 4. The selection of preferred specific values for $\alpha$ and $\beta$ will now be described. Preferably, $\alpha \leq \beta$ for two reasons. First, while an ILEC may essentially choose to engineer in such a way that $\beta<<\alpha$ or $\beta \approx 0$, that may not correspond to a realistic performance assessment criteria, since it would report almost every occurrence of $\delta>0$ as a "fail." Second, it may also have some other counterintuitive implications. For instance, when $\beta<\alpha$, the threshold, T, is a decreasing function of $\sigma$. This means that, in the presence of noise (i.e., variance, $\sigma^2$), the parity test gets more conservative (i.e., a smaller T) in order to keep MS small. There should be some positive "allowance" for $\delta$, however, because of inherent volatility around the average CRs when the day-to-day variation of $\delta$ (i.e., $\sigma^2$) is relatively large. Thus, preferably $\beta \geq \alpha$, since T is then an increasing function of $\sigma$.

Based on these two reasons, preferably $0.1 \geq \beta \geq \alpha$. As previously set forth above, the threshold, T, is most sensitive to the choice of $\Delta$, and therefore, there is much less sensitivity to $\alpha$ and $\beta$ since, for reasonable parameter values, the "allowance" is only a small fraction of T. For example, with a limit of $\beta/\alpha<5$, the contribution of allowance is less than 20% of T, even for $\sigma=\sigma_{cut}$. Consequently, for selecting specific values, $\alpha$ and $\beta$ are preferably based on well-accepted and widely-used action thresholds known in the equal-access arena. Accordingly, by using the performance thresholds in the equal access arena, the specific values for these parameters are preferably $\alpha=0.025$ and $\beta=0.1$, with $\beta/\alpha=4$.

With $\alpha=0.025$, $\beta=0.1$, and $\Delta=4$, the above equations for computing the threshold, T, and the SD cutoff, $\sigma_{cut}$, may be rewritten as follows:

$T=2+0.322* \sigma$ $\sigma_{cut}=1.198$

FIG. 7 shows a graphical representation of these values and equations, and their use in Steps 206 and 208 of the parity metric of FIG. 5. As with Step 105 described above, the parity test "passes" in Step 208 when the average sample difference, $\delta$, is less than or equal to the threshold, T. The threshold, T, may be calculated by entering the SD, $\sigma$, into the equation for the threshold, T. set forth above. As shown in FIG. 7, the preferred threshold, T, ranges fairly linearly from 2.0, when the SD, $\sigma$, is zero, to 2.4, when the SD, $\sigma$, is equal to the SD cutoff, $\sigma_{cut}$ (i.e., 1.198). If the parity test or metric "passes" (i.e., $\delta$ is below the line for T in FIG. 7), then a PASS 203 is declared and the method 200 of the present invention is completed. In contrast, if the average sample difference, $\delta$, is greater than the threshold, T (i.e., $\delta$ is above the line for T in FIG. 7), the parity test does not pass in Step 208, and a FAIL 209 is declared. Preferably, the FAIL 209 is identical to the FAIL 107, with the same results.

It should be understood that the graphical representation of these values and equations shown in FIG. 7 is not applicable to Steps 206 and 208 of the method 200 of the present invention if the $CR_{CLEC}$ is equal to or greater than 97%, since a PASS 203 would have already been declared in Step 202. Similarly, as shown in FIG. 7, for any $\delta$ less than zero (i.e., negative) or equal to zero, regardless of 6, a PASS 203 would have already been declared in Step 204. In addition, for ease of illustration, the depicted values for $\delta$ and $\sigma$ do not extend outside the ranges (-1,5) and (0,2.5), respectively, in FIG. 7. It should be understood, however, that the actual values for $\delta$ and $\sigma$ may extend beyond these ranges.

FIGS. 8, 9A–9B, and 10 show several examples using the method 200 of the present invention, illustrating the possible outcomes of FAIL 209, PASS 203, and INDETERMINATE 207 over a 20-day business month. In FIG. 8, two examples are shown to illustrate the FAIL 209 outcome for an ILEC and CLEC CNA. In example 1, the $CR_{ILEC}$ is relatively high at about 99.4%, while the $CR_{CLEC}$ is persistently and significantly lower than the $CR_{ILEC}$ at about 73.2%. As a result, the average sample difference, $\delta$, is 26.2, the SD, $\sigma$, is 0.286, and the threshold, T, is 2.092. Consequently, the parity test declares a FAIL 209, since the $CR_{CLEC}$ is less than 97%, the sample difference, $\delta$, is greater than the threshold, T, and the SD, $\sigma$, is less than the SD cutoff, $\sigma_{cut}$, of 1.198.

In example 2 of FIG. 8, both the $CR_{ILEC}$ and the $CR_{CLEC}$ are relatively high at about 97.8% and 95.2%, respectively, but the $CR_{CLEC}$ is persistently and significantly lower than the $CR_{ILEC}$. As a result, the average sample difference, $\delta$, is 2.6, the SD, $\sigma$, is 0.756, and the threshold, T, is 2.24. Consequently, the parity test declares a FAIL 209, since the $CR_{CLEC}$ is less than 97%, the sample difference, $\delta$, is greater than the threshold, T, and the SD, $\sigma$, is less than the SD cutoff, $\sigma_{cut}$, of 1.198.

Figure 9A:
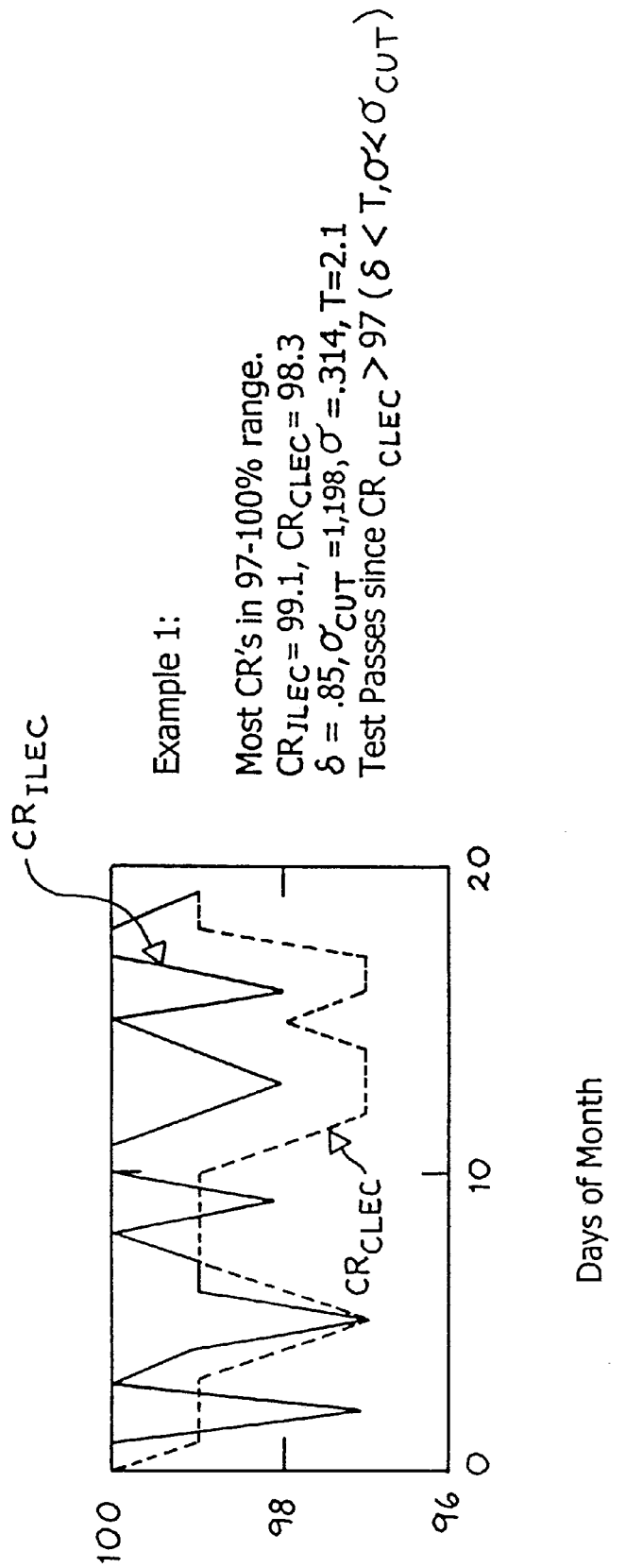

Examples 1–3 of FIGS. 9A–9 B illustrate the PASS 203 outcome for an ILEC and CLEC CNA. In example 1 of FIG. 9A, the $CR_{ILEC}$ is relatively high at about 99.1%, and the $CR_{CLEC}$ is also relatively high at about 98.3%. As a result, the average sample difference, $\delta$, is 0.85, the SD, $\sigma$, is 0.314, and the threshold, T, is 2.1. Consequently, the parity test declares a PASS 203, since the $CR_{CLEC}$ is greater than 97% (see Step 202 ).

In example 2 of FIG. 9B, both the $CR_{ILEC}$ and the $CR_{CLEC}$ are relatively low at about 74.5% and 73.2%, respectively, but the $CR_{CLEC}$ is slightly lower than the $CR_{ILEC}$ and somewhat more variable. As a result, the average sample difference, $\delta$, is 1.3, the SD, $\delta$, is 0.259, and the threshold, T, is 2.083. Consequently, the parity test declares a PASS 203, since although the $CR_{CLEC}$ is less than 97%, the sample difference, $\delta$, is less than the threshold, T, and the SD, $\sigma$, is less than the SD cutoff, $\sigma_{cut}$, of 1.198.

In example 3 of FIG. 9B, both the $CR_{ILEC}$ and the $CR_{CLEC}$ are near 100% at about 99.1% and 96.8%, respectively, but the $CR_{CLEC}$ has two days that are relatively lower (i.e., 85–90%) than the $CR_{ILEC}$. As a result, the average sample difference, $\delta$, is 2.25, the SD, $\sigma$, is 0.86, and the threshold, T, is 2.3. Consequently, the parity test declares a PASS 203, since although the $CR_{CLEC}$ is less than 97%, the sample difference, $\delta$, is less than the threshold, T, and the SD, $\sigma$, is less than the SD cutoff, $\sigma_{cut}$, of 1.198.

In FIG. 10, two examples are shown to illustrate the INDETERMINATE outcome 207 for an ILEC and CLEC CNA. In example 1, both the $CR_{ILEC}$ and the $CR_{CLEC}$ are relatively high (i.e., near 100%) at about 99.4% and 95.7%, respectively, but the $CR_{CLEC}$ has one low day at about 60%. As a result, the average sample difference, δ, is 3.7, the SD, σ, is 2.061, and the threshold, T, is 2.663. Consequently, the parity test declares an INDETERMINATE outcome 207, since the SD, σ, is greater than the SD cutoff, $σ_{cut}$, of 1.198. Accordingly, the parity test is unable to determine whether performance parity is achieved for the ILEC and CLEC CNA.

In example 2 of FIG. 10, the $CR_{ILEC}$ is relatively high at about 99.4%, while the $CR_{CLEC}$ is relatively low (i.e., 80%) for about half the 20-day business month period, with an overall average $CR_{CLEC}$ of about 86.65%. As a result, the average sample difference, δ, is 12.75, the SD, σ, is 2.289, and the threshold, T, is 2.736. Consequently, the parity test declares an INDETERMINATE outcome 207, since the SD, σ, is greater than the SD cutoff, $σ_{cut}$, of 1.198. Accordingly, the parity test is unable to determine whether performance parity is achieved for the ILEC and CLEC CNA. It should also be noted that in example 2 of FIG. 10, the cause of the disparity and lower $CR_{CLEC}$ in the first half of the month appears to have been addressed and corrected, as evidenced by the rise in the $CR_{CLEC}$ to near 100% for the second half of the month.

The methodology of the present invention is particularly useful for measuring performance parity among CNAs, since it may be summarized in a few lines of code, a table, or a simple "field of use" graph. It should also be readily apparent from the foregoing description and accompanying drawings that the methodology of the present invention is an improvement over the prior art methodology of busy-hour trunk blocking for measuring network performance parity. For instance, the method of the present invention is based on solid and classical statistical decision theory practices, with assumptions that are consistent with widely-accepted and broadly-implemented tariffs and performance measures in the interconnection arena. In addition, the method of the present invention utilizes innovative features that make it simple in structure, yet powerful and flexible enough to discern among the three outcomes (i.e., pass, fail and indeterminate). The method of the present invention is also based on the call completion percentage or ratio measure, which is better correlated to realized quality of customer service than the traditional trunk blocking of the prior art. Moreover, the method of the present invention will encourage good business behaviors among ILECs and CLECs because: (1) it "passes" only when both the ILEC and CLEC have consistently comparable CRs; (2) it "fails" when the CLEC's CR is significantly and persistently lower than the ILEC's CR, thereby possibly leading to an investigation and to ILEC and/or CLEC network augments or upgrades; and (3) it has an "indeterminate" outcome that potentially results in a joint investigation and resolution of parity problems in order to minimize unwarranted expenditures by either the ILEC or CLEC.

Those skilled in the art to which the invention pertains may make modifications in other embodiments employing the principles of this invention without departing from its spirit or essential characteristics, particularly upon considering the foregoing teachings. Accordingly, the described embodiments are to be considered in all respects only as illustrative, and not is restrictive, and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A method for measuring network performance parity comprising the steps of:

computing a call completion ratio for at least one network provider;

determining whether the call completion ratio passes a first test;

assessing whether a second test is determinate if the call completion ratio does not pass the first test; and assessing whether the call completion ratio passes the second test if the second test is determinate.

2. The method of claim 1 further comprising the step of declaring a pass if the call completion ratio passes one of the first test and the second test.

3. The method of claim 1 further comprising the step of declaring an indeterminate outcome if the second test is not determinate.

4. The method of claim 1 further comprising the step of declaring a fail if the call completion ratio does not pass the second test.

5. The method of claim 1 further comprising the steps of:

declaring a pass if the call completion ratio passes one of the first test and the second test;

declaring an indeterminate outcome if the second test is not determinate; and declaring a fail if the call completion ratio does not pass the second test.

6. A method for measuring network performance parity comprising the steps of:

computing a first call completion ratio for a first network provider, and a second call completion ratio for a second network provider;

computing a difference between the first call completion ratio and the second call completion ratio;

computing a variance for the difference between the first call completion ratio and the second call completion ratio;

determining whether one of the first call completion ratio and the difference passes an initial test;

determining whether the variance is greater than a variance cutoff if the initial test is not passed; and determining whether the difference is greater than a threshold if the variance is not greater than the variance cutoff.

7. The method of claim 6 further comprising the step of declaring a pass if one of the first call completion ratio and the difference passes the initial test.

8. The method of claim 6 further comprising the step of declaring an indeterminate outcome if the variance is greater than the cutoff variance.

9. The method of claim 6 further comprising the step of declaring a pass if the difference is not greater than the threshold.

10. The method of claim 6 further comprising the step of declaring a fail if the difference is greater than the threshold.

11. The method of claim 6 further comprising the steps of:

declaring a pass if one of the first call completion ratio and the difference passes the initial test;

declaring an indeterminate outcome if the variance is greater than the cutoff variance;

declaring a pass if the difference is not greater than the threshold; and declaring a fail if the difference is greater than the threshold.

12. The method of claim 6 further comprising the step of determining whether the first call completion ratio is less than a third call completion ratio, as part of the initial test.

13. The method of claim 12 wherein the third call completion ratio is one of 0.97 and 97%.

14. The method of claim 12 further comprising the step of declaring a pass if the first call completion ratio is not less than the third call completion ratio.

15. The method of claim 14 wherein the third call completion ratio is one of 0.97 and 97%.

16. The method of claim 6 further comprising the steps of computing the difference by subtracting the first call completion ratio from the second call completion ratio, and determining whether the difference is greater than zero, as part of the initial test.

17. The method of claim 16 further comprising the step of declaring a pass if the difference is not greater than zero.

18. The method of claim 6 further comprising the steps of:
   determining whether the first call completion ratio is less than a third call completion ratio, as part of the initial test;
   computing the difference by subtracting the first call completion ratio from the second call completion ratio; and
   determining whether the difference is greater than zero, as part of the initial test.

19. The method of claim 18 further comprising the step of declaring a pass if one of the first call completion ratio is not less than the third call completion ratio, and the difference is not greater than zero.

20. The method of claim 18 further comprising the steps of:
   declaring a pass if one of the first call completion ratio is not less than the third call completion ratio, and the difference is not greater than zero;
   declaring an indeterminate outcome if the variance is greater than the cutoff variance;
   declaring a pass if the difference is not greater than the threshold; and
   declaring a fail if the difference is greater than the threshold.

* * * * *